(12) United States Patent
Chen

(10) Patent No.: US 6,806,608 B2
(45) Date of Patent: Oct. 19, 2004

(54) MOTOR-DRIVEN BICYCLE AND BRUSHLESS MOTOR THEREOF

(75) Inventor: Chin-Ming Chen, Taipei (TW)

(73) Assignee: Delta Electronics Inc., Taoyuan Sien (TW)

( * ) Notice: Subject to any disclaimer, the term of this patent is extended or adjusted under 35 U.S.C. 154(b) by 17 days.

(21) Appl. No.: 10/629,827

(22) Filed: Jul. 30, 2003

(65) Prior Publication Data

US 2004/0056549 A1 Mar. 25, 2004

(30) Foreign Application Priority Data

Sep. 19, 2002 (TW) .......................................... 91121427 A

(51) Int. Cl.[7] .............................................. H02K 17/00
(52) U.S. Cl. ..................... 310/166; 310/75 C; 310/268; 180/220
(58) Field of Search ............................. 310/166, 75 C, 310/268, 254; 180/218, 220

(56) References Cited

U.S. PATENT DOCUMENTS

| 5,920,139 | A | * | 7/1999 | Fujiwara et al. | ....... 310/154.11 |
| 6,278,216 | B1 | * | 8/2001 | Li | ............................... 310/254 |
| 6,340,067 | B1 | * | 1/2002 | Fujiwara et al. | ............ 180/206 |
| 6,355,996 | B1 | * | 3/2002 | Birkestrand | ................... 310/54 |
| 6,717,324 | B2 | * | 4/2004 | Chen | .......................... 310/268 |

* cited by examiner

*Primary Examiner*—Thanh Lam
(74) *Attorney, Agent, or Firm*—Birch, Stewart, Kolasch & Birch, LLP

(57) ABSTRACT

A bicycle driven by a brushless motor. The vehicle has at least one wheel with a plurality of ferromagnetic steel elements annularly disposed on the rim. Three C-shaped electromagnets are connected to the body of the vehicle to alternatively attract the steel elements, maintaining wheel rotation.

11 Claims, 6 Drawing Sheets

US 6,806,608 B2

MOTOR-DRIVEN BICYCLE AND BRUSHLESS MOTOR THEREOF

This nonprovisional application claims priority under 35 U.S.C. § 119(a) on Patent Application No(s). 091121427 filed in TAIWAN, R.O.C. on Sep. 19, 2002, which is (are) herein incorporated by reference.

BACKGROUND OF THE INVENTION

1. Field of the Invention

The present invention relates to a brushless motor structure for a vehicle, and in particular to the brushless motor structure having ferromagnetic steel elements disposed on a wheel of a vehicle.

2. Description of the Related Art

A conventional motor-driven bicycle usually uses a chain driven by a motor to rotate the wheels. However, the gears of the conventional bicycle are small and have fewer teeth. The levers acting on the wheels are also shorter, such that the output power of motors must be larger to provide enough torque to drive the bicycle. Furthermore, permanent magnets are used to be magnetic poles of the conventional motor-driven bicycles. When power runs out, permanent magnets cause counter-electromotive force (CEMF). Hence, the load increases, and the user is required to exert more energy to power the conventional motor-driven bicycle.

SUMMARY OF THE INVENTION

Accordingly, an object of the invention is to provide a brushless motor structure for a vehicle, such as a motor-driven bicycle. Although the motor has a simple structure, it can provide larger output torque. Moreover, when the battery of the vehicle is exhausted, the user can power the vehicle without an increase in load.

The present invention provides a brushless motor for a vehicle. The vehicle has a plurality of electromagnets connected to the body and a wheel with ferromagnetic steel elements annularly disposed on the wheel. Each electromagnet provides an opening through which the wheel travels. When the wheel rotates, at least one steel element is magnetically charged. The electromagnets attract the at least one steel element to pass through the gap, thus maintaining wheel rotation. s In a preferred embodiment, the wheel has a rim. The steel elements are secured on the rim. The brushless motor further has a battery electrically connected to the electromagnets.

Furthermore, the steel elements are disposed on the rim with the same first angular intervals, and the electromagnets are disposed on the main body with the same second angular intervals. The first angular intervals are not equal to the second angular intervals. The ratio of the first angular intervals and the second angular intervals can be 3:2.

The present invention also provides a motor-driven bicycle using the brushless motor above.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
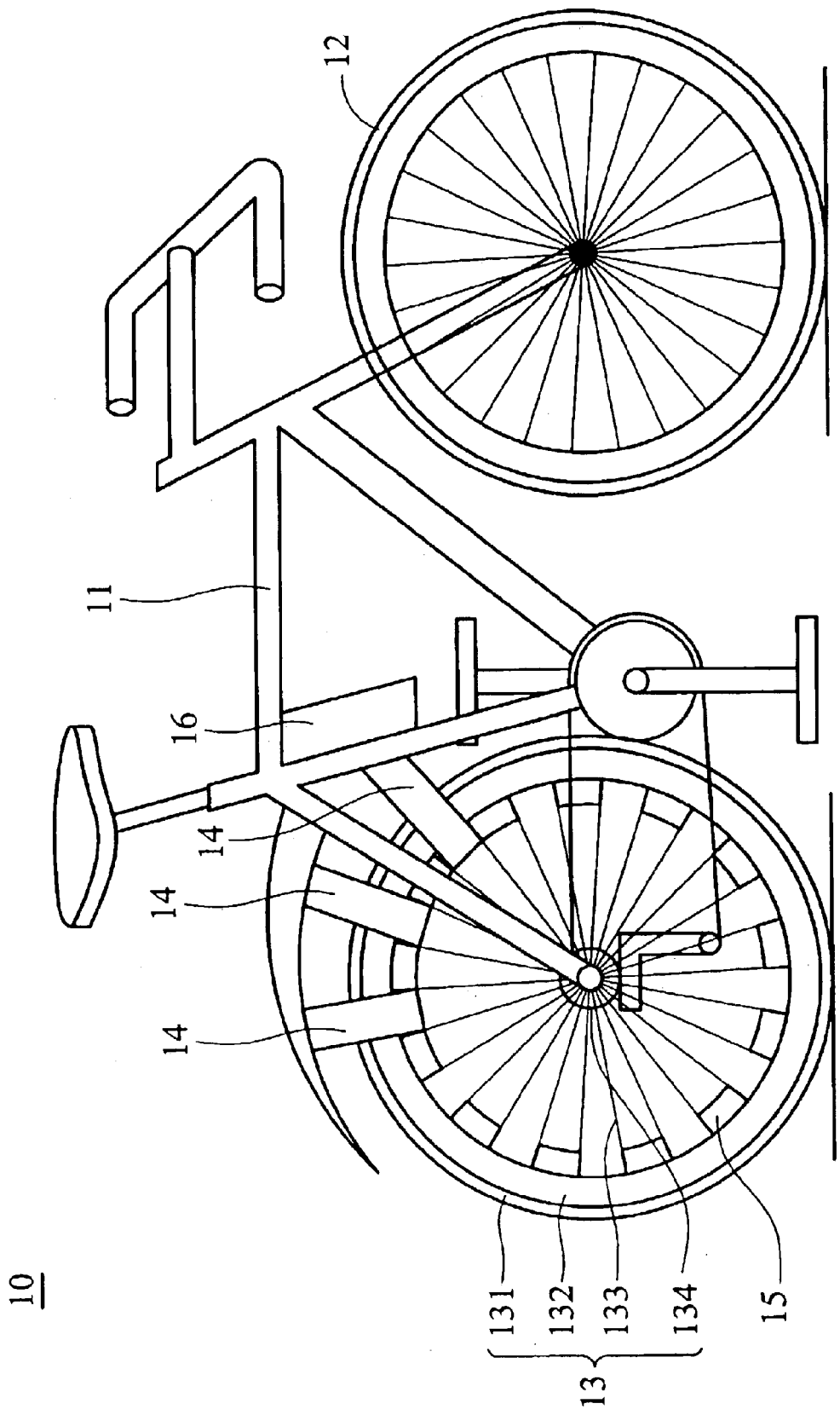
FIG. 1 is a schematic view of a motor-driven bicycle of the invention.

FIG. 1 is a schematic view of a motor-driven bicycle of the invention. In FIG. 1, the motor-driven bicycle includes a body 11, a front and rear wheel 12, and 13 thereon. A plurality of ferromagnetic steel elements 15 annularly disposed on the rear wheel 13, and a plurality of C-shaped electromagnets 14 are connected to the body 11 around the rear wheel 13. A battery 16 disposed on the body 11 is electrically connected to the electromagnets 14 providing power.

Figure 2A:
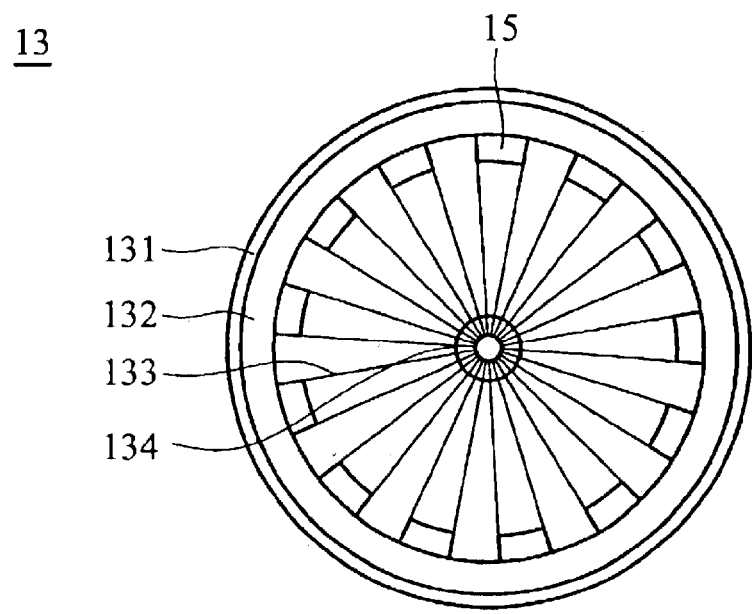
FIG. 2A is an enlarged schematic view showing the rear wheel in FIG. 1.

FIG. 2A is an enlarged schematic view showing the rear wheel in FIG. 1. In FIG. 2A, the rear wheel 13 of the motor-driven bicycle 10 includes a tire 131, rim 132, hub 134, and a plurality of spokes 133. The ferromagnetic steel elements 15 are in the same shape and annularly disposed between the rim 132 and the spokes 133 of the rear wheel 13. The steel elements 15 are secured on the rim 132 around the wheel 13 at the same interval. The ferromagnetic steel elements 15 are carbon steel elements, coated with an anti-rust treatment on the surface.

Figure 2B:
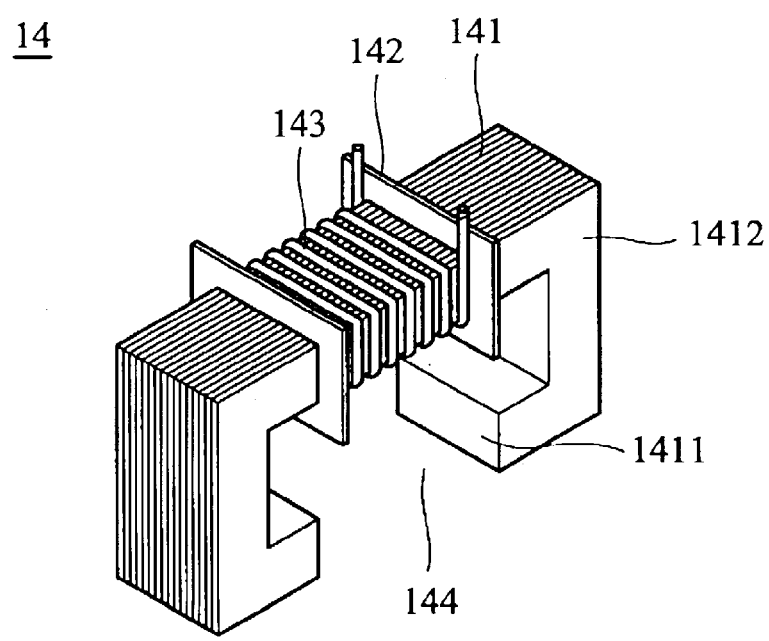
FIG. 2B is an enlarged schematic view of the C-shaped electromagnet in FIG. 1.

In FIG. 1, the electromagnets are connected to the rear fender and the seat tube of the bicycle. FIG. 2B is an enlarged schematic view of the C-shaped electromagnet in FIG. 1. In FIG. 2B, the electromagnet 14 in a preferred embodiment is formed by stacked silicon steel elements 141 with a coil 143 disposed between two partitions 142. When the coil 143 becomes active, each end 1411 of the electromagnet 14 act as a north and south magnetic pole, and form a magnetic field in the gap 144 between the ends 1411.

Figure 2C:
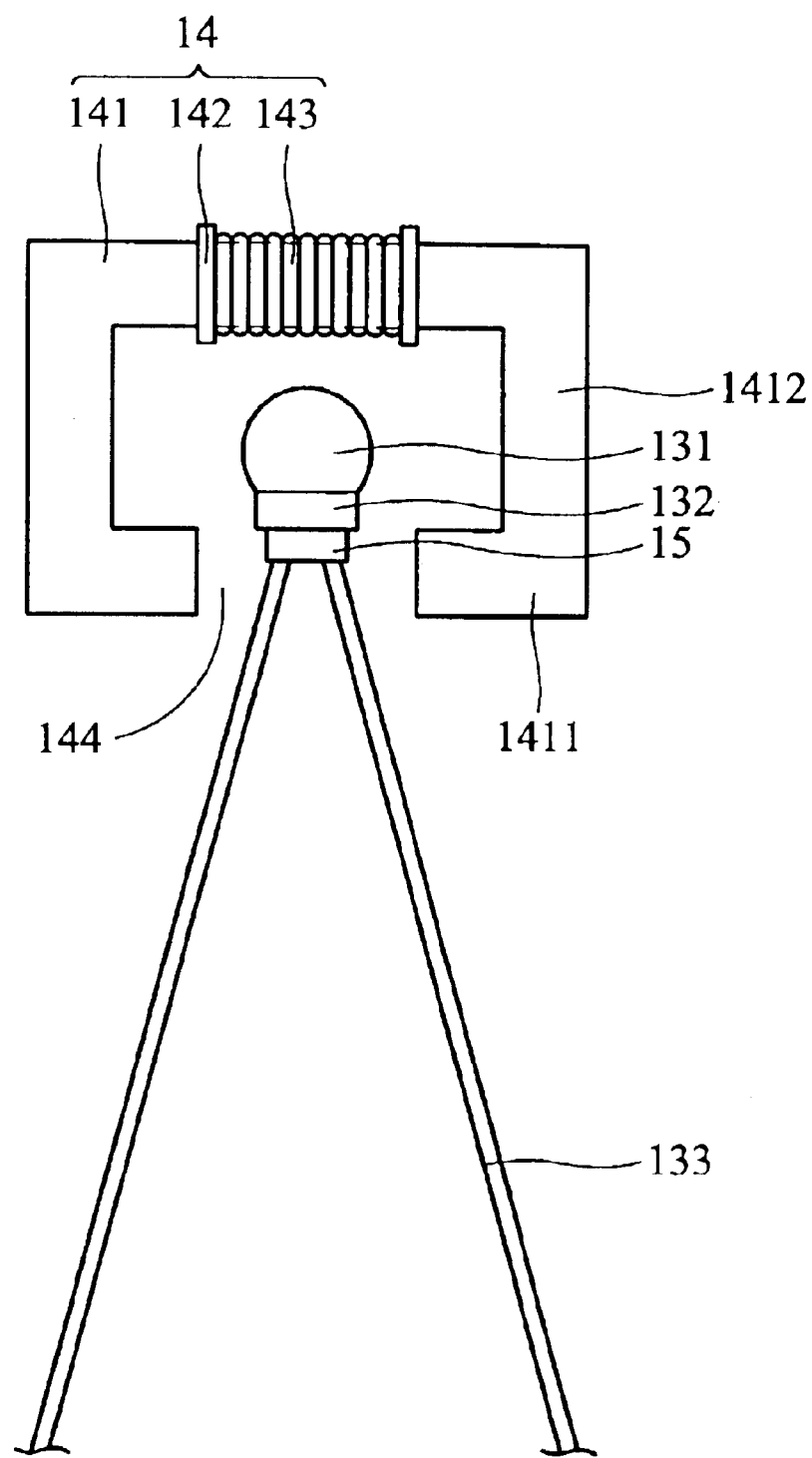
FIG. 2C is a schematic diagram showing the relative position of the electromagnets and the steel elements.

FIG. 2C is a schematic diagram showing the relative position of the electromagnets and the steel elements. In FIGS. 1 and 2C, the C-shaped electromagnets 14 provide and opening over the rear wheel 13. When the rear wheel 13 rotates, the tire 131 and rim 132 pass through the C-shaped opening 1412 of the electromagnets 14, and the steel elements 15 pass through the gap 144 between the ends 1411. Thus, the magnetic field formed by the electromagnets 14 can attract the steel elements 15, maintaining wheel 13 rotation and powering the bicycle 10.

Figure 3A:
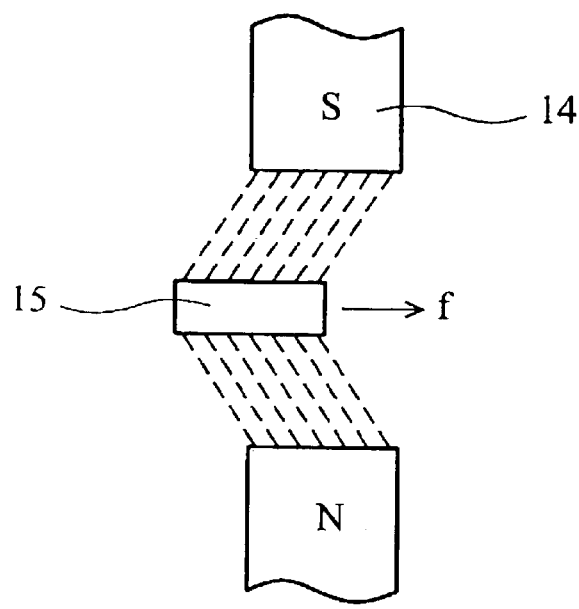
FIG. 3A is a schematic view showing a steel element attracted by a electromagnet when approaching thereof.
Figure 3B:
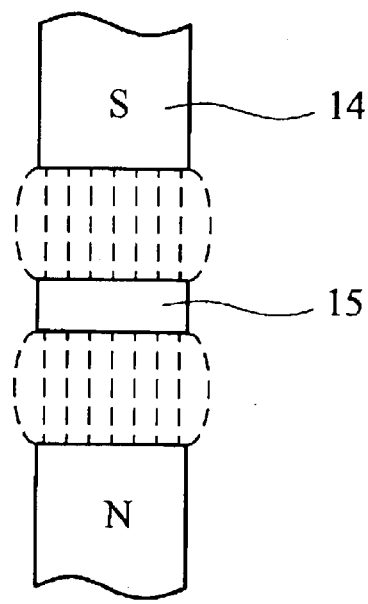
FIG. 3B is a schematic view showing a steel element arriving a central position of the electromagnet.

FIG. 3A is a schematic view showing a steel element attracted by an electromagnet. In FIG. 3A, when the coil 142 of the electromagnet 14 becomes active, a magnetic field is formed between the ends of the electromagnet 14. At the same time, when a ferromagnetic steel element 15 approaches the ends of the conductive electromagnet 14, the steel element 15 is magnetically charged and attracted to the center of the gap as shown in FIG. 3B by magnetic force f. The positions of the C-shaped electromagnets 14 of the invention ensure that at least one steel element 15 can be magnetically charged when the rear wheel rotates. Thus, the electromagnets 14 sequentially attract the following steel elements 15 to pass through the gap, maintaining wheel rotation.

FIGS. 4A–4D are schematic views showing the steel elements disposed on the rear wheel attracted by the electromagnets. In order to simplify the drawings, FIGS. 4A–4D only show three C-shaped electromagnets 14a, 14b, 14c and three linearly disposed steel elements 15a, 15b, 15c. In FIGS. 4A–4D, the steel elements 15a, 15b, 15c of the invention are disposed on the rim 132 with the same first angular intervals $d_1$. The electromagnets 14a, 14b, 14c are disposed on the body of the bicycle with the same second angular intervals $d_2$. Furthermore, the first angular intervals $d_1$ are not equal to the second angular intervals $d_2$. In a preferred embodiment, the ratio of the first angular intervals $d_1$ and the second angular intervals $d_2$ is 3:2. The width of the steel elements 15a–15c is slightly larger than the width of the ends 1411 of the electromagnets 14. Their detailed description is provided in the following.

Figure 4A:
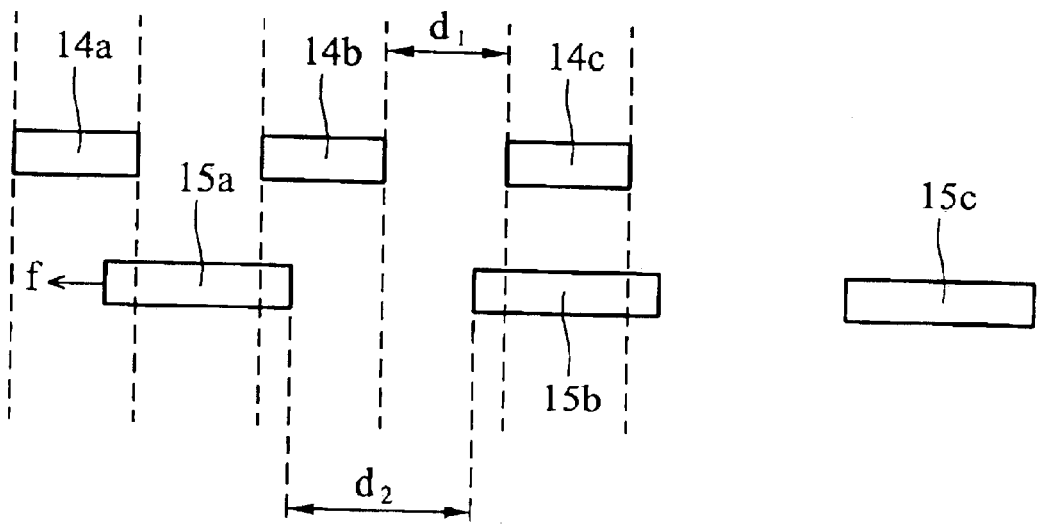
FIGS. 4A~4D are schematic views showing the steel elements disposed on the rear wheel attracted by the electromagnets of the invention.
Figure 4B:
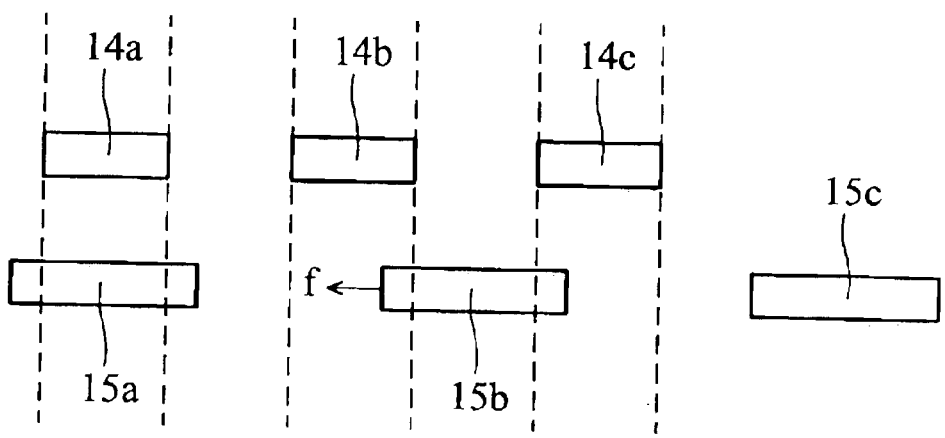
Figure 4C:
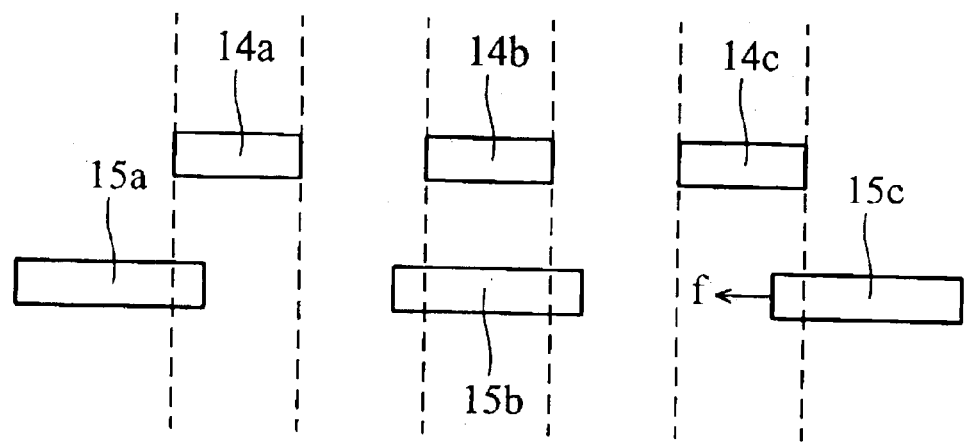
Figure 4D:
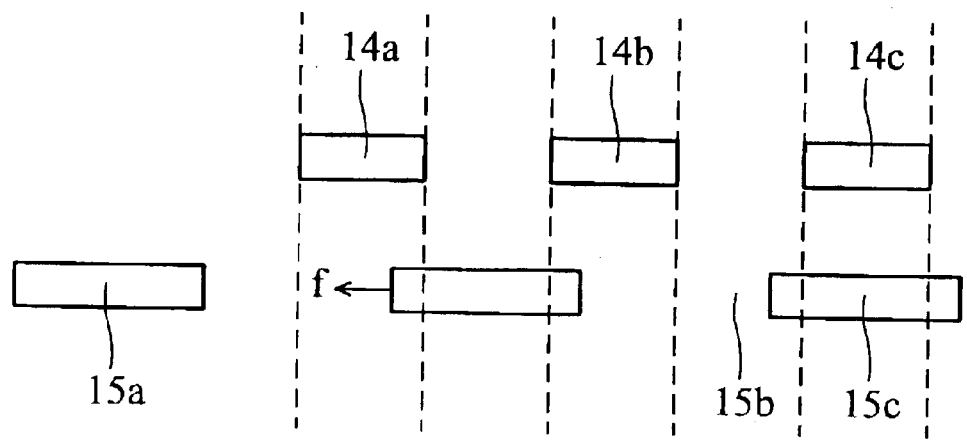

In FIG. 4A, the electromagnets of the invention are controlled by a control module (not shown), such as a microprocessor. When the electromagnet 14a is activated and the other electromagnets 14b, 14c are inactive, the electromagnet 14a induces a magnetic field and attracts the steel element 15a with a magnetic force f to rotate the rear wheel. In FIG. 4B, when the steel element 15a reaches the magnetic center of the electromagnet 14a, the electromagnet 14a is turned off and the electromagnet 14b becomes active. The steel element 15b is simultaneously attracted by another magnetic force f and moves forward. The wheel of the bicycle maintains rotation. In FIG. 4C, when the steel element 15b reaches the magnetic center of the electromagnet 14b, the electromagnet 14b is turned off, and the electromagnet 14c becomes active. At the same time, the steel element 15c is attracted by a magnetic force f to drive the rear wheel 13 of the invention. Finally, when the steel element 15c reaches the magnetic center of the electromagnet 14c, the electromagnet 14c is turned off and the electromagnet 14a becomes active again. Thus, the steel element 15b is again attracted to maintain rear wheel rotation.

Moreover, the electromagnets 14 of the invention can be controlled according to the position signal sensed by optical sensors, such as infrared diodes, disposed at the edges of the electromagnets 14. When the light emitted from the optical sensor is blocked by a steel element, the corresponding electromagnet is turned on. When the optical sensor later receives the emitted light, the corresponding electromagnet is turned off and stops providing magnetic field. Thus, the brushless motor of the invention can continuously rotate the wheel.

Moreover, the level of the driving torque acting on the motor-driven bicycle of the invention is almost equal to the level of the friction generated by the ground surface. Therefore, the motor-driven bicycle can produce larger output torque while requiring less output power, such that the bicycle can begin moving.

A conventional bicycle can be retrofitted with a motor of the motor-driven bicycle of the invention. Two or more electromagnets can be disposed thereon to provide larger output torque. Furthermore, the motor-driven bicycle of the invention does not use permanent magnets. When the battery is exhausted, users can power the bicycle without an increase in load.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A brushless motor for a bicycle comprising:
    a plurality of ferromagnetic steel elements, annularly disposed on the wheel; and
    a plurality of electromagnets connected to the body, each electromagnet provides an opening through which the wheel travels, wherein when the wheel rotates, at least one steel element is magnetically charged, and the electromagnets attract at least one steel element to pass through the gap, maintaining wheel rotation.

2. The brushless motor as claimed in claim 1, wherein the wheel has a rim, the steel elements are secured on the rim.

3. The brushless motor as claimed in claim 1, further comprising:
    a battery electrically connected to the electromagnets and disposed on the main body.

4. The brushless motor as claimed in claim 3, wherein the steel elements are disposed on the rim with the same first angular intervals, the electromagnets are disposed on the main body with the same second angular intervals, and the first angular intervals are not equal to the second angular intervals.

5. The brushless motor as claimed in claim 4, wherein the ratio of the first angular intervals and the second angular intervals is 3:2.

6. A motor-driven bicycle, comprising:
    a main body;
    a main body with at least one wheel thereon;
    a plurality of ferromagnetic steel elements, annularly disposed on the wheel; and
    a plurality of electromagnets connected to the body, each of the electromagnets provides an opening through which the wheel travels, wherein when the wheel rotates, the steel elements pass through the opening.

7. The motor-driven bicycle as claimed in claim 6, wherein the wheel has a rim, the steel elements' are secured on the rim.

8. The motor-driven bicycle as claimed in claim 6, further comprising:
    a battery electrically connected to the electromagnets and disposed on the main body.

9. The motor-driven bicycle as claimed in claim 6, wherein when the wheel rotates, at least one steel element is magnetically charged, and the electromagnets attract at least one steel element to pass through the opening, maintaining wheel rotation.

10. The motor-driven bicycle as claimed in claim 9, wherein the steel elements are disposed on the rim with the same first angular intervals, the electromagnets are disposed on the main body with the same second angular intervals, and the first angular intervals are not equal to the second angular intervals.

11. The motor-driven bicycle as claimed in claim 10, wherein the ratio of the first angular intervals and the second angular intervals is 3:2.

* * * * *